United States Patent [19]

Hinterkeuser et al.

[11] 4,087,922
[45] May 9, 1978

[54] PRODUCTION OF HOMOGENEOUS MIXTURES OF DRY MATERIAL

[75] Inventors: Jakob Hinterkeuser, St. Augustin; Rolf Jehmlich, Cologne, both of Germany

[73] Assignee: Klöckner-Humboldt-Deutz Aktiengesellschaft, Germany

[21] Appl. No.: 724,616

[22] Filed: Sep. 20, 1976

[30] Foreign Application Priority Data

Sep. 20, 1975 Germany .............................. 2542087

[51] Int. Cl.² .............................................. F26B 7/00
[52] U.S. Cl. .......................................... 34/12; 34/60; 159/4 VM
[58] Field of Search ................. 34/9, 10, 12, 43, 60, 34/69; 159/45 R, 4 A, 4 VM, DIG. 20

[56] References Cited

U.S. PATENT DOCUMENTS

| 2,438,450 | 3/1948 | Nelson .................................. 34/9 X |
| 2,561,442 | 7/1951 | Lyon, Jr. et al. .......................... 34/9 |
| 2,677,608 | 5/1954 | McKay et al. ........................ 34/9 X |

Primary Examiner—John J. Camby
Attorney, Agent, or Firm—Hill, Gross, Simpson, Van Santen, Steadman, Chiara & Simpson

[57] ABSTRACT

The invention relates to a method and apparatus for the production of commercially utilizable, homogeneous raw meal-like mixtures from fine grained, moist materials, particularly from sludges, slimes, slurries, etc., and additives.

7 Claims, 1 Drawing Figure

U.S. Patent  May 9, 1978  4,087,922
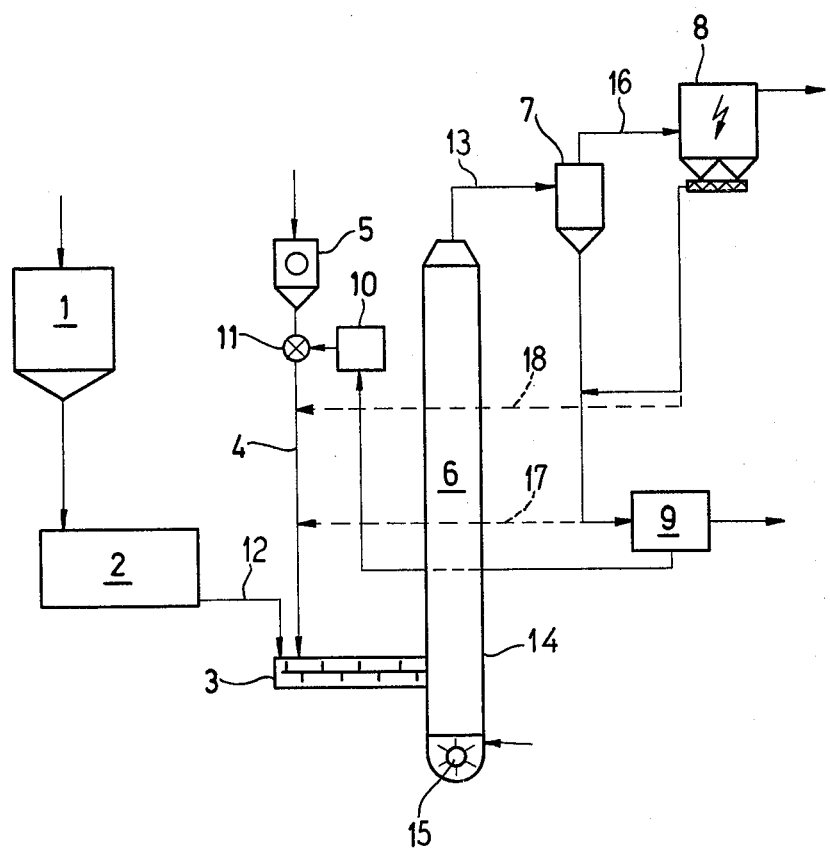

PRODUCTION OF HOMOGENEOUS MIXTURES OF DRY MATERIAL

BACKGROUND OF THE INVENTION

The finely-grained, moist materials occurring in large cities and industries, particularly sludges, are, dehydrated in known manner with the aid of filter apparatus and/or, after expensive thermal drying processes, subsequently burned in a furnace or put to another type of use. The organic and/or inorganic constituents present in such fine-grained, moist materials are lost thereby, or scarcely utilized.

BRIEF SUMMARY OF THE INVENTION

This invention relates to a method and apparatus for the production of homogeneous dry powdered mixtures comprising fine grained, moist starting materials, particularly sludged, slimes, slurries, etc., and additives.

A principal object of this invention concerns creating a technique which makes possible an almost complete utilization of the substances present in fine-grained, moist materials, particularly those in sludge-like compositions. This object is achieved in that the starting fine grained moist materials, after previous dehydration, are mixed with dosaged quantities of additive substances, and are fed, for drying and homogenization, into a dryer, particularly a pneumatic conveyer gas dryer. By virtue of the fact that, according to the invention, the materials mixed with the additive substances are fed into a dryer wherein drying is attained by hot gases, such as in a pneumatic conveyer, gas drying is achieved, in addition to the desired drying, an intensive homogenization of this mixture, so that, in most cases, a further subsequent homogenization may be dispensed with. Through selection and dosaging of the additive substances, very advantageously influence may be had on the composition and characteristics of the end product desired in each case. Preferred products are free flowing powders. With the selection in each case of the additive substances, in reference to the end product, consideration is preferably given understandably to the organic and/or inorganic constitutents present in each case in the finely granular, moist starting materials. The essential advantage of the technique according to the invention consists, accordingly, in an almost complete recovery and utilization of the organic and/or the inorganic constituents present in the starting materials, which are preferably sludges.

In advantageous further development of the invention, there are added to or admixed with the moist materials, lime, limestone, clay and/or sand. In this connection, particularly with the utilization of lime as an additive substance, the dried and homogenized product materials are very advantageously worked into clinkers.

In order to continuously practice the technique according to this invention, in accordance with an advantageous further development thereof, the dehydration of the fine grained, moist materials is accomplished with the aid of a rotary filter.

In order to attain a sufficiently accurate distribution of the components within the mixture of a pulverized raw starting material, in accordance with an advantageous further development of the invention, the dosaging of the additive substances takes place by means of continuous metering and analysis of the composition of the dried homogenized product materials. By means of such measures, and also with the aid of conventional measuring-and regulating-devices, without noteworthy delay in relation to stream processing rates very advantageously an accurate dosaging of the additive substances, relative to the composition of the starting fine grained moist materials, may be carried out.

BRIEF DESCRIPTION OF THE DRAWING

In the drawing is shown a schematic representation of one embodiment of a system suitable for the practice of the present invention continuously.

DETAILED DESCRIPTION

The technique according to this invention is explained in greater detail by reference to the accompanying diagrammatic drawing. As shown in the drawing, the fine-grained, moist materials, for example, sludges, are preferably thickened initially in a gravity type thickener. For example, a continuous gravity thickener, is preferably used, such as a circular or rectangular thickener.

The resulting thickened material is conveniently discharged downwardly out of a thickener 1 into a rotary drum-type continuous operating filter 2 for dewatering. In this filter 2 a dewatering of sludge to preferably at least about a 20% water content preferably takes place.

The dewatered material is conveyed away from the filter 2 into a mixing- or conveyor worm 3 via a line 12. Concurrently, there is charged from a supply bin or the like (not shown) to the worm 3 via a conduit 4 at least one additive substance selected from the group consisting of lime, limestone, clay, and sand, which additive substance is in a fine grain form. Thus, the additive substance is preliminarily mixed with the dehydrated solids in worm 3.

In this conduit 4 is arranged, in one preferred embodiment, a comminution apparatus 5, so that the additive substances, before they are mixed with the dewatered solids are preferably comminuted immediately before use into a desired granulation for each particular type of dehydrated solids feed contemplated for processing in accord with this invention. The mixed material discharged out of the mixing worm 3 immediately enters a pneumatic conveyor dryer 6. Pneumatic conveyor dryer 6 utilizes an upright long tube or duct 14 carrying therethrough a heated gas at high velocity. A fan 15 at the lower end of tube 14 propels the gas. The worm 3 adds and disperses particulate solids into the gas stream in tube 14. These solids are transported in tube 14 upwardly by the gas stream, and are discharged therefrom into a cyclone separator 7 which is connected in series via a conduit 13 with the gas dryer 6. During the drying operation in the gas dryer 6, an intensive intermixing and homogenization of the components of the solids introduced by the worm 3 into the dryer 6 takes place. The mixed material separated from the gases in the separator 7 is discharged downwardly therefrom and comprises a finished, homogenized dried powdered mixture of product raw material, which, in most cases may be, for example, subsequently processed, without separate additional homogenization, into clinkers, or the like, as desired. The gases conveyed off upwardly out of the separator 7 via conduit 16 are fed into an electrical (electrostatic) precipitator 8 before being discharged. Powdered product collected in precipitator 8 is blended with product from separator 7, as shown.

In order to control the composition of the components in the particulate product from separator 7 and precipitator 8, the amount of additive substance introduced into worm 3 is regulated. For this purpose, an automatic, continuously operating x-ray fluorescence monitoring device 9 is provided which functions to continuously analyze the composition of the dried and homogenized product materials collected from separator 7 and precipitator 8. Depending upon the exact measured values determined thereby a representative signal is produced which is fed to a conventional controller device 10. Controller 10 is functionally interconnected with a regulator (not shown) which operates a variable valve unit 11 in conduit 4. Signals produced by device 9 are, for example, compared to a preset signal generated by controller 10 which preset signal is representative of a predetermined desired composition for product powdered solids. From such comparison, controller 10 generates a difference signal representative of any difference between such signal generated by device 9 and the preset signal. This difference signal is used to operate the regulator so as to move such valve unit 11 to predetermined positions between open and closed positions. In this way, the quantity of additive substances mixed with dewatered solids is continuously and automatically controlled. In order to be able to carry out continuously the charging of the additive substances, as desired, a reservoir (now shown) may be located between the comminution apparatus 5 and the valve unit 11.

If desired, a fraction of the product powdered material may be pneumatically conveyed out of the separator 7 via a conduit 17 into conduit 4 and hence into worm 3, in order to decrease the water content of the material charged into drier 6 to a predetermined extent.

Also, if desired, a fraction of the product powdered material collected by filter 8 is pneumatically conveyed out of the precipitator 8 via a conduit 18 into conduit 4 and hence into worm 3.

It will be understood that various modifications can be made to the described embodiments without departing from the scope of the present invention.

We claim as our invention:

1. A process for drying a sludge, said sludge initially being comprised of an aqueous phase and a particulate solids phase, said process comprising the steps of continuously dewatering said sludge in a rotary drum type filter zone, charging said dewatered sludge and a particulate additive to a pneumatic conveyer type gas dryer to produce a mixed stream comprised of gas and dried particulate solids, first passing said mixed streams into a cyclone type separator and collecting separated particulate solids, secondly passing the residual gas stream from said cyclone type separator into an electrostatic type precipitator and collecting separated solids, analyzing by x-ray fluorescence the composition of said separated solids and generating a signal representative of such analysis, and maintaining said composition within predetermined limits by regulating the rate of said charging with said signal.

2. The process of claim 1 wherein said particulate additive is selected from the group consisting of lime, limestone, clay and sand.

3. The process of claim 1 wherein, in said maintaining, said signal is compared to a preset signal representative of a predetermined said composition, and, as a result of said comparison, an output signal is generated which is representative of any difference between said signal and said preset signal.

4. The process of claim 1 wherein said sludge is preliminarily passed through a thickener.

5. The process of claim 1 wherein a fraction of product powdered material collected in said first passing is fed back into said pneumatic conveyer type gas dryer.

6. The process of claim 1 wherein a fraction of product powdered material collected in said second passing is fed back into said pneumatic conveyer type gas dryer.

7. Apparatus for continuously drying a sludge, said sludge initially being comprised of an aqueous phase and a particulate solids phase, said apparatus comprising:

a rotary drum type filter means,
a worm conveyer means including first particulate solids conveyer means functionally interconnecting said worm conveyer means with said rotary drum type filter means,
supply means for a particulate additive, including second particulate solids conveyer means functionally interconnecting said worm conveyer means with said supply means,
variable valve means in said second conveyer means,
pneumatic conveyer type gas dryer means, including an elongated upright tube means, fan means associated with a lower end portion of said tube means for propelling a heated gas upwardly through said tube means, means for heating such gas, and connector means functionally interconnecting the terminal end of said worm conveyer means with said tube means above said fan means,
cyclone type separator means adapted to separate and collect particulate solids from a flowing gas stream, including a first gas particulate solids mixed stream input port means, a first particulate solids output port means in a bottom portion thereof, a first residual gas output port means in an upper portion thereof, and third conveyer means functionally interconnecting an output port means in an upper portion of said tube means with said gas/particulate solids mixed stream,
electrostatic type precipitator means adapted to separate and collect particulate solids from a flowing gas stream, including a second gas/particulate solids mixed stream input port means, a second particulate solids output port means in a bottom portion thereof, a second residual gas output port means in an upper portion thereof, and fourth conveyer means functionally interconnecting said first residual gas output port means with said second gas/particulate solids mixed stream input port means,
x-ray fluorescent composition analyzing means adapted for analysis of a particulate, continuously flowing stream, including fifth conveyer means functionally interconnecting said first particulate solids output port means and said second particulate solids output port means with said analyzing means and also signal generating means adapted to generate signals representative of the actual composition analyzed by said analyzing means,
regulator means functionally associated with said valve means and adapted to move said valve means to predetermined positions ranging from a substantially open position to a substantially closed position in response to an input signal fed thereto, and
controller means functionally interconnecting said analyzing means with said regulator means, said controller means being adapted to receive and compare said instantaneous signal with a preset signal generated by said controller means, said preset signal being representative of a predetermined composition to be achieved in particulate product solids from said cyclone type separator means and said electrostatic type precipitator means during operation of said apparatus, said controller means being further adapted to generate an output signal representative of any difference between said instantaneous signal and said preset signal and to feed said output signal to said regulator means whereby passage of said particulate additive from said supply means to said worm conveyer means is controlled by the composition of said particulate product solids during operation of said apparatus.

* * * * *